UNITED STATES PATENT OFFICE.

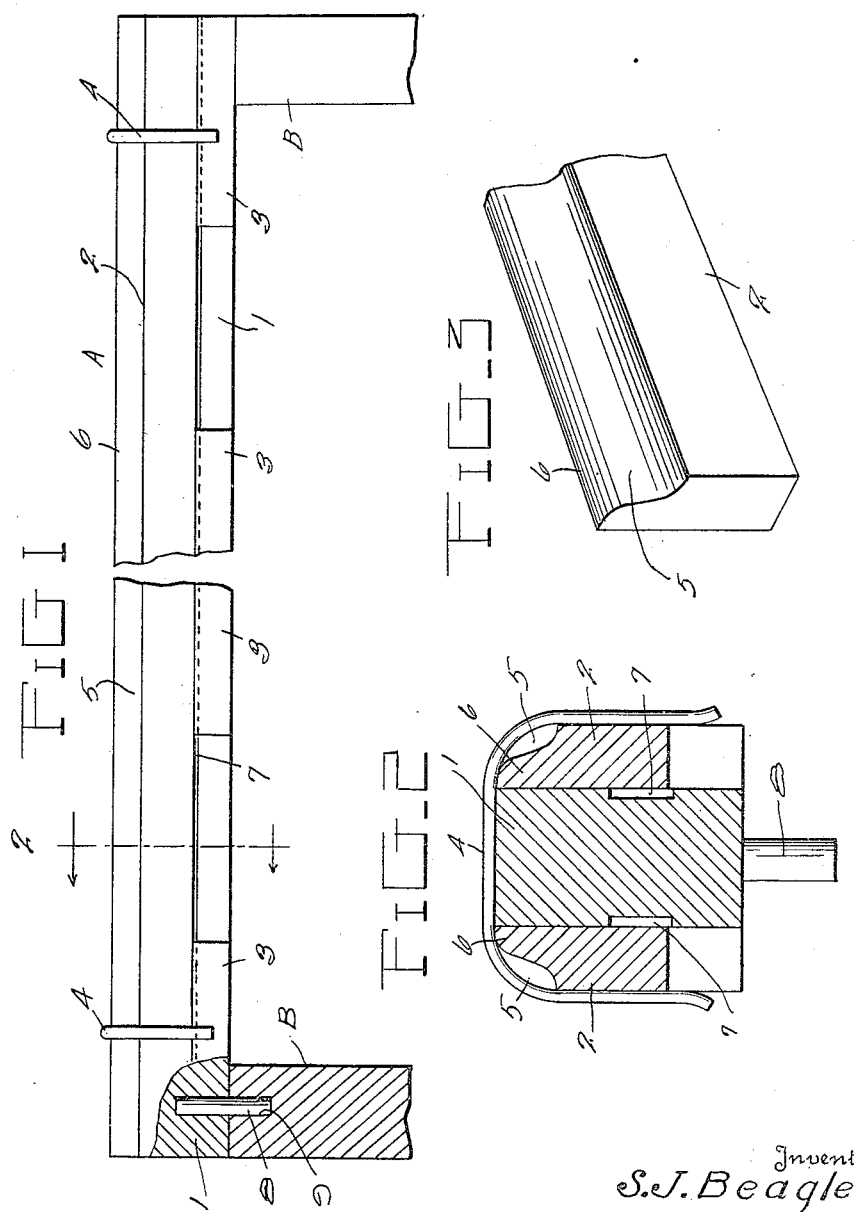

SILAS J. BEAGLE, OF WALTON, NEW YORK.

POULTRY-ROOST.

1,214,412.

Specification of Letters Patent. Patented Jan. 30, 1917.

Application filed October 13, 1915. Serial No. 55,688.

*To all whom it may concern:*

Be it known that I, SILAS J. BEAGLE, a citizen of the United States, residing at Walton, in the county of Delaware and State of New York, have invented certain new and useful Improvements in Poultry-Roosts; and I do hereby declare the following to be a full, clear, and exact description of the invention, such as will enable others skilled in the art to which it appertains to make and use the same.

The primary object of this invention is to provide a roost for poultry, which will serve to effectively entrap vermin upon leaving the body of the fowl or poultry.

Another object of this invention is to provide a roost for carrying out the above object, which can be manufactured cheaply, easily installed, will be durable and efficient in use and can be readily taken down to remove the entrapped vermin therefrom.

A further object of the invention is to provide a roost formed of detachably connected sections, whereby the roost can be taken apart and cleaned, so as to be rendered sanitary.

Other objects will appear and be better understood from the embodiment of my invention of which the following is a specification, reference being had to the accompanying drawings forming a part thereof, in which:—

Figure 1 is a side elevation of the roost with one corner broken away so as to show the manner of connecting the roost to a support, Fig. 2 is a vertical sectional view, taken on the line 2—2 of Fig. 1, and looking in the direction of the arrows, Fig. 3 is a detail perspective view of one of the sections of which the roost is formed.

Referring to the drawings, the letter A designates the roost as an entirety, and B is the support for the roost.

The roost includes an intermediate section 1 and slidable side sections 2—2, the said sections 2—2 resting upon cleats 3 mounted upon the opposite sides of the ends and the center of the intermediate section. When the sections are assembled, as shown in Figs. 1 and 2, the said sections are held in their assembled position by means of U-shaped wire clips 4, which engage over the upper edges of the sections and along the outer sides of the sections 2—2. The sections 2—2 are cut away at their upper edges, as at 5—5, so as to provide narrow vertical flanges 6—6, which, together with the upper edge of the intermediate section 1, form a gripping surface for the feet of the poultry.

The opposite sides of the intermediate sections are provided with longitudinal grooves 7—7, which open into the opposite ends of the intermediate section and into the outer surface of the sides of the intermediate section and normally are covered by the side sections 2—2, as shown in Fig. 2.

The opposite ends of the intermediate section 1, carry depending cylindrical pins 8, the lower ends of which are detachably received by sockets 9 in the upper ends of the support B, so as to connect the roost to the support.

The manner of trapping the vermin is effected as follows:—The vermin (which it has been found, have a tendency to leave the poultry early in the morning, while the poultry is still roosting, and seek dark secluded parts, and to leave the places of seclusion at night and to infest the poultry), upon leaving the poultry and getting upon the roost, will crawl through the spaces or crevices between the sides and intermediate sections and into the grooves 7—7, in the sides of the intermediate section, which have been rendered dark by virtue of being closed or covered by the side sections 2—2, and remain therein. After the poultry has left the roost, the said roost is removed from the support and taken apart and the sections immerged in boiling water, resulting in the killing of the vermin which collected in the grooves 7—7, and which adhere to the sides of the sections 1 and 2, after which operation the sections are again assembled in roost formation and mounted on the support.

From the foregoing description taken in connection with the accompanying drawings, it will be seen that I have provided a cheap, durable and efficient roost, that will effectively entrap vermin and which can be readily and conveniently cleaned, so as to be rendered sanitary.

Having thus described my invention, what I claim as new is:—

A poultry roost of the character described comprising an intermediate section having trapping grooves therein, cleats carried by the intermediate section and having their upper sides disposed above the lower wall of the grooves, side sections associated with the intermediate section and resting on the upper sides of the cleats and covering the grooves for the major portion of the width of the grooves.

In testimony whereof I affix my signature in presence of two witnesses.

SILAS J. BEAGLE.

Witnesses:
ARTHUR J. McCOOK,
HOWARD L. ARCHER.